United States Patent
Vaddi et al.

(12)

(10) Patent No.: US 6,387,299 B1
(45) Date of Patent: May 14, 2002

(54) PROCESS FOR PRODUCING ELECTROLUMINESCENT PHOSPHOR WITH INCREASED EFFICIENCY

(75) Inventors: Butchi Reddy Vaddi; Shellie K. Northrop, both of Sayre, PA (US)

(73) Assignee: Osram Sylvania Inc., Danvers, MA (US)

( * ) Notice: Subject to any disclaimer, the term of this patent is extended or adjusted under 35 U.S.C. 154(b) by 5 days.

(21) Appl. No.: 09/630,400

(22) Filed: Aug. 2, 2000

(51) Int. Cl.$^7$ .......................... C09K 11/56; C09K 11/54
(52) U.S. Cl. .................................. 252/301.65
(58) Field of Search .................. 252/301.65, 301.5, 252/301.4 R, 301.4 P, 301.4 S, 304.4 H, 301.6 R, 301.6 F, 301.6 P

(56) References Cited

U.S. PATENT DOCUMENTS 4,874,985 A * 10/1989 Hase et al. ............ 252/301.6 S

* cited by examiner

Primary Examiner—C. Melissa Koslow
(74) Attorney, Agent, or Firm—William H. McNeill

(57) ABSTRACT

An electroluminescent phosphor with an increased efficiency is created by blending a chloride flux, a copper source and a zinc sulfide to form a mixture and then heating the mixture for a period of time, cooling the mixture, and washing it with de-ionized water. The mixture is dried and milled to form cubic ZnS from hexagonal ZnS, forming a beginning uncoated ZnS:Cu,Cl electroluminescent phosphor. This beginning phosphor is added to other materials, including $Ga_2O_3$, forming a second step material (SSM). The SSM is placed into a first vessel, such as a plastic bottle, blended, sifted and then placed in a second inert reaction vessel that is then heated for a period of time. After cooling, the fired SSM is washed with de-ionized water, washed with acetic acid, again washed with de-ionized water to remove residual acid, washed with KCN and again with de-ionized water to remove residual KCN. The fired and washed SSM is then dried, filtered and sifted, producing a new phosphor with an increased efficiency.

8 Claims, No Drawings

PROCESS FOR PRODUCING ELECTROLUMINESCENT PHOSPHOR WITH INCREASED EFFICIENCY

TECHNICAL FIELD

This application relates to a process for producing an electroluminescent phosphor, and particularly, to a process that produces an electroluminescent phosphor that has increased efficiency.

BACKGROUND ART

Electroluminescent phosphors are used for backlighting in LCD's, in copying machines, for backlighting membrane switches, for automotive dashboard and control switch illumination, for automotive interior lighting, for aircraft style information panes, for aircraft information lighting, and for emergency egress lighting. U.S. Pat. Nos. 3,014,873; 3,076,767; 4,859,361; 5,009,808; and 5,100,499 relate to methods for producing electroluminescent phosphors. The methods described in these patents result in electroluminescent phosphors that have achieved general commercial success; however, the efficiency of these phosphors has left something to be desired. The present process results in a phosphor that requires less power, allowing it to be used in smaller devices where power consumption is a concern. It would, therefore, be an advance in the art to provide phosphors having increased efficiency. Efficiency is defined as light output per unit of power consumption and as used herein the term shall comprise lumens per watt or LPW.

DISCLOSURE OF INVENTION

It is, therefore, an object of the present invention to obviate the disadvantages of the prior art.

It is another object of the invention to produce electroluminescent phosphors that are more efficient than those heretofore produced.

These objects are achieved, in one aspect of the invention, by synthesizing the phosphor with $Ga_2O_3$. The reaction takes place under the following conditions; zinc sulfide, in the presence of activators and halide fluxes, is heated in a furnace to produce a phosphor material. This material is cooled and washed. This material is known as first step fired material (FSF). The phosphor at this stage is largely inactive with respect to electroluminescent output. The FSF material is then blended with other materials, including $Ga_2O_3$, and then heated to a lower temperature than the first step firing. The resulting material is then cooled, washed again and sifted, creating a new electroluminescent phosphor having an efficiency greater than the original phosphor.

BEST MODE FOR CARRYING OUT THE INVENTION

For a better understanding of the present invention, together with other and further objects, advantages and capabilities thereof, reference is made to the following disclosure and appended claims.

The increase in efficiency of the electroluminescent phosphors gained by the practice of the process is shown by the examples below:

TABLE I

| Sample | $Ga_2O_3$ Moles | Color Coordinates | 2.0 Hr Brightness (Foot Lamberts) | 24 Hr Brightness (Foot Lamberts) | Half-life Hrs | Efficiency LPW |
|---|---|---|---|---|---|---|
| 323-81-1 Control | 0.00 | 0.176 0.421 | 35.4 | 34.9 | 897 | 4.148 |
| 323-81-2 | 0.001 | 0.175 0.419 | 34.9 | 34.1 | 863 | 4.985 |
| 323-81-3 | 0.002 | 0.176 0.423 | 34.2 | 33.5 | 898 | 5.226 |
| 323-81-4 | 0.005 | 0.177 0.431 | 30.7 | 30.2 | 979 | 5.185 |

In Table I, the color coordinates for the phosphors are given per the standard C.I.E. Chromaticity Diagram; the brightness is at the 2 hour and 24 hour periods of lamp operation and the efficiency, as noted, is in lumens per watt.

As can be seen from Table I, when the electroluminescent phosphors prepared by the process herein disclosed are compared to the non-treated phosphor, the phosphor synthesized with $Ga_2O_3$ has an increased efficiency with virtually no change in color coordinates.

More specifically, the process is especially suited for zinc sulfide, copper activated phosphors or other zinc sulfide phosphors where copper is a co-activator.

The method comprises heating zinc sulfide (approximately 1% chloride-containing) in a furnace to an elevated temperature (e.g., 1205° C.) in the presence of a copper activator and halide fluxes (as is known in the art) to provide a phosphor that is substantially inactive with respect to electroluminescent activity. This phosphor is then cooled to ambient temperature and washed to remove the flux. The resulting ZnS:Cu,Cl phosphor is then milled, remixed with Cu compounds and $ZnSO_4$ and refired. The refired materials are then washed, dried and sifted. Phosphors created by this method are known. One such phosphor is a Type 723 electroluminescent phosphor available from Osram Sylvania Inc., Towanda, Pa.

The method of the invention is practiced by blending a FSF ZnS:Cu,Cl phosphor with other materials, including $Ga_2O_3$. In a preferred embodiment, the other materials comprise $CuSO_4$, $ZnSO_4 \cdot 7H_2O$ and sulfur; however, other materials may be used, as known in the art. This mixture is placed in a first inert vessel, such as a plastic bottle. The mixture is blended for a period of time, e.g., 20 minutes to 30 minutes, by mechanical shaking or other similar method. The blended mixture is then loaded into a second inert reaction vessel, for example, 100 ml alumina crucibles. The second reaction vessel is then fired for a second period of time. The second step fired cake is then cooled and washed with de-ionized water. Preferably, 1.242 liters of water are used per 75 grams of FSF material used in the 2nd step blended mixture. The mixture is then washed with acetic acid to eliminate some excess copper and zinc compounds and other impurities. In a preferred embodiment, 0.777 liters of hot de-ionized water+148.8 ml glacial acetic acid per every 75 grams of the fired SSM was used but other concentrations are useable. The material is then washed again with de-ionized water to wash off any residual acid. The acid-free material is then washed with KCN solution to eliminate any remaining unwanted copper. In a preferred embodiment, 0.777 liters of hot de-ionized water+37.54 grams of KCN per 75 grams of the SSM was employed. The material was allowed to cool and washed with de-ionized water to remove residual KCN. The resulting phosphor is then dried, allowed to cool and sifted through a −325 mesh stainless steel sieve.

To more fully illustrate the invention, the following non-limiting example is presented.

EXAMPLE I

Appropriate amounts of ZnS containing 1% choride, copper sulfate as the primary activator, sulfur and zinc oxide are blended together with flux materials comprising 3% $BaCl_2$, 3% $MgCl_2$, and 2% NaCl by weight of the ZnS material and are then placed in a covered crucible. The crucible is fired in a furnace at a temperature of about 1205° C. for about 3 hours to 5 hours and 15 minutes to form a fired cake. The fired cake is taken from the crucible, cooled, and washed with de-ionized water to remove the fluxes, and then dried.

The resulting material is then milled for a period of about 1½ hours to induce transformation of hexagonal ZnS to the cubic form. At this stage the resulting material is a ZnS:Cu, Cl phosphor that is not completely active as an electroluminescent phosphor. Such material is referred to as a "beginning phosphor" or a first step fired (FSF) material.

To 75 grams of the FSF material is added 1.86 grams $CuSO_4$, 19.17 grams $ZnSO_4.7$ $H_2O$, 0.289 grams $Ga_2O_3$ (0.002 mole/ZnS) and 0.296 grams sulfur (0.012 mole/ZnS) to form what is referred to as the second step material (SSM). The SSM is blended in plastic bottles for 20 minutes on a mechanical shaker. The now blended SSM is removed from the bottles and any lumps are crushed. The material is then loaded into 100 ml alumina crucibles, covered with alumina lids and fired in an electric furnace for 2 hours and 15 minutes at 700° C. The fired crucibles are taken out of the furnace and cooled until they are warm to the touch. The SSM is then dropped into water and washed with de-ionized water twice with 1.242 liters of water per 75 grams of the fired SSM phosphor. After this, the material is washed with acetic acid (0.777 liters of hot de-ionized water+148.8 ml glacial acetic acid per every 75 grams of the fired SSM to eliminate excess copper and other compounds and flux additives and impurities. The SSM is then washed with hot de-ionized water again at least twice to wash off any residual acid (until free from acid—pH to be about 6.0).

The SSM is then washed with KCN solution (0.777 liters of hot de-ionized water+37.54 grams of KCN per 75 grams of the fired SSM and allowed to settle for 20–30 minutes and decanted so that the KCN solution is placed into a proper KCN container for further treatment. The SSM is then washed with hot de-ionized water at least twice to eliminate residual KCN. The SSM turns to almost colorless from darker greenish gray body color.

The SSM is then filtered, dried at about 120° C. for 4–16 hours and cooled. The SSM is then sifted through a −325 mesh stainless steel sieve resulting in a new phosphor with increased efficiency.

The new electroluminescent phosphor created by this process (Sample 323-81-3 in Table I) had an efficiency of 5.23 LPW as compared to an efficiency of 4.15 LPW for the control (Sample 323-81-1 in Table 1) created by the process but not synthesized with $Ga_2O_3$ and sulfur in the second step. This resulted in a desirable improvement of approximately 25%.

As will be seen from Table I, there is a definite correlation between the amount of improvement and the moles of $Ga_2O_3$ allowed to react with the beginning phosphor.

Thus there is provided a process for producing an electroluminescent phosphor with an increased efficiency.

While there have been shown and described what are at present considered the preferred embodiments of the invention, it will be apparent to those skilled in the art that various changes and modifications can be made herein without departing from the scope of the invention as defined by the appended claims.

What is claimed is:

1. A process for producing an electroluminescent phosphor comprising the steps of;

(a) combining a beginning phosphor comprised of ZnS:Cu,Cl with $Ga_2O_3$, and $CuSO_4$, $ZnSO_4.7H_2O$ and sulfur to form a second step material (SSM);

(b) placing the SSM in a first inert reaction vessel;

(c) blending the SSM for a period of time;

(d) placing the blended SSM into a second inert reaction vessel;

(e) heating the second inert reaction vessel for a period of time, removing it from the heat and allowing it to cool;

(f) washing the SSM with de-ionized water;

(g) washing the SSM with de-ionized water and acetic acid;

($g_1$) washing the acid-washed material with de-ionized water to remove any residual acid:

(h) washing the SSM with KCN;

(i) washing the SSM with de-ionized water;

(j) filtering the SSM;

(k) drying the SSM; and (l) sifting the SSM.

2. The process of claim 1 wherein said blending is accomplished by mechanical shaking.

3. The process of claim 1 wherein the second inert reaction vessel is an alumina crucible.

4. The process of claim 1 wherein the second inert reaction vessel is heated in an electric furnace for 2 hours and 15 minutes at 700° C.

5. The process of claim 1 wherein said acetic acid is prepared by mixing 0.777 liters of hot de-ionized water with 148.8 ml glacial acetic acid per every 75 grams of fired SSM.

6. The process of claim 1 wherein said KCN is prepared by mixing 0.777 liters of hot de-ionized water with 37.54 grams of KCN per 75 grams of fired SSM.

7. The process of claim 1 wherein the SSM is dried for 4 to 16 hours at 120° C.

8. The process of claim 1 wherein the SSM is sifted through a −325 stainless steel sieve.

* * * * *